(12) United States Patent
Ohori et al.

(10) Patent No.: US 11,174,804 B2
(45) Date of Patent: Nov. 16, 2021

(54) CONTROLLER AND CONTROL METHOD FOR VEHICLE

(71) Applicant: TOYOTA JIDOSHA KABUSHIKI KAISHA, Toyota (JP)

(72) Inventors: Shinya Ohori, Miyoshi (JP); Miwa Hinoshita, Okazaki (JP); Junji Hyodoh, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/130,823

(22) Filed: Dec. 22, 2020

(65) Prior Publication Data
US 2021/0215112 A1 Jul. 15, 2021

(30) Foreign Application Priority Data
Jan. 10, 2020 (JP) .............................. JP2020-002693

(51) Int. Cl.
*F02D 41/06* (2006.01)
*F02M 55/02* (2006.01)
*F02D 41/22* (2006.01)

(52) U.S. Cl.
CPC ........... *F02D 41/068* (2013.01); *F02D 41/22* (2013.01); *F02M 55/025* (2013.01); *F02D 2041/224* (2013.01); *F02D 2200/0602* (2013.01); *F02D 2200/70* (2013.01)

(58) Field of Classification Search
CPC .... F02D 41/068; F02D 41/22; F02D 41/3845; F02D 41/222; F02D 2041/224; F02D 2200/0602; F02D 2200/70; F02D 2009/0245; F02M 25/025
See application file for complete search history.

(56) References Cited

U.S. PATENT DOCUMENTS

| | | | | |
|---|---|---|---|---|
| 2011/0160981 | A1* | 6/2011 | Rieger | F02D 41/22 701/103 |
| 2015/0219522 | A1* | 8/2015 | Tseng | F02D 41/22 701/102 |
| 2018/0163661 | A1* | 6/2018 | Ohori | F02D 41/3845 |
| 2019/0078527 | A1* | 3/2019 | Kim | F02D 41/2403 |

FOREIGN PATENT DOCUMENTS

| | | |
|---|---|---|
| JP | 2015-132171 A | 7/2015 |
| JP | 2018-096278 A | 6/2018 |

* cited by examiner

*Primary Examiner* — George C Jin
(74) *Attorney, Agent, or Firm* — Finnegan, Henderson, Farabow, Garrett & Dunner, LLP

(57) ABSTRACT

A controller includes a soak timer, a nonvolatile memory, and a determining section. The determining section is configured to perform a rationality check on a condition that a performance condition is met. The determining section is also configured to make the performance condition strict when an obtained index value of a vehicle outside temperature, that is obtained when an elapsed amount of time reaches a specified amount of time, and the determining section is activated, is higher than a stored index value of the vehicle outside temperature stored in the nonvolatile memory.

8 Claims, 6 Drawing Sheets

CONTROLLER AND CONTROL METHOD FOR VEHICLE

BACKGROUND

1. Field

The present disclosure relates to a controller and a control method for controlling a vehicle equipped with an internal combustion engine.

2. Description of Related Art

Japanese Laid-Open Patent Publication No. 2018-96278 discloses a controller that performs a rationality check of a fuel pressure sensor that is provided in a high-pressure fuel supply system of an internal combustion engine mounted on a vehicle. When a specified amount of time has elapsed since a main switch of the vehicle was turned off, a fuel pressure is detected by a fuel pressure sensor provided in a delivery pipe of the high-pressure fuel supply system, and the controller determines whether the detected pressure is within a normal range.

When the main switch of the vehicle is off and the internal combustion engine is in a stopped state, the delivery pipe is sealed. Thus, after the main switch is turned off, the fuel temperature decreases, so that the volume of the fuel is reduced. This decreases the fuel pressure in the delivery pipe. The specified amount of time is set to allow for an assumption that the decrease in the fuel temperature when the specified time has elapsed from when the main switch was turned off is sufficient, so that the fuel pressure in the delivery pipe has been decreased to a value in the vicinity of a reference pressure. The reference pressure is the median of the normal range.

If the vehicle outside temperature increases after the main switch is turned off, the temperature of fuel when the specified amount of time has elapsed may be high, and the fuel pressure in the delivery pipe may become higher than the reference pressure. In such a case, even if the fuel pressure sensor is operating normally, the fuel pressure that is detected when the specified amount of time has elapsed may be out of the normal range, so that an erroneous determination may be made.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a vehicle controller for a vehicle equipped with an internal combustion engine is provided. The vehicle includes a high-pressure fuel pump, a delivery pipe that stores high pressure fuel pressurized by the high-pressure fuel pump, a fuel injection valve that injects fuel stored in the delivery pipe, and a fuel pressure sensor that detects a pressure of the fuel in the delivery pipe. The controller includes a soak timer that measures an amount of time elapsed since a main switch of the vehicle was turned off, a nonvolatile memory that retains information even when the main switch is turned off so that a power supply is stopped, and a determining section that is configured to be activated when the elapsed amount of time reaches a specified amount of time while the main switch is off, obtain a fuel pressure using the fuel pressure sensor, and perform a rationality check for determining whether the obtained fuel pressure is within a normal range. The determining section is configured to perform the rationality check on a condition that a performance condition is met, and make the performance condition strict in a case in which an obtained index value of a vehicle outside temperature, that is obtained when the elapsed amount of time reaches the specified amount of time and the determining section is activated, is higher than a stored index value of the vehicle outside temperature, that is stored in the nonvolatile memory before the main switch is turned off so that the power supply is stopped, as compared to a case in which the obtained index value of the vehicle outside temperature is not higher than the stored index value of the vehicle outside temperature.

In a second general aspect, a vehicle controller for a vehicle equipped with an internal combustion engine is provided. The vehicle includes a high-pressure fuel pump, a delivery pipe that stores high pressure fuel pressurized by the high-pressure fuel pump, a fuel injection valve that injects fuel stored in the delivery pipe, and a fuel pressure sensor that detects a pressure of the fuel in the delivery pipe. The controller comprises circuitry includes a soak timer that measures an amount of time elapsed since a main switch of the vehicle was turned off, a nonvolatile memory that retains information even when the main switch is turned off so that a power supply is stopped, and a determining section that is configured to be activated when the elapsed amount of time reaches a specified amount of time while the main switch is off, obtain a fuel pressure using the fuel pressure sensor, and perform a rationality check for determining whether the obtained fuel pressure is within a normal range. The determining section is configured to perform the rationality check on a condition that a performance condition is met, and make the performance condition strict in a case in which an obtained index value of a vehicle outside temperature, that is obtained when the elapsed amount of time reaches the specified amount of time and the determining section is activated, is higher than a stored index value of the vehicle outside temperature, that is stored in the nonvolatile memory before the main switch is turned off so that the power supply is stopped, as compared to a case in which the obtained index value of the vehicle outside temperature is not higher than the stored index value of the vehicle outside temperature.

In a third general aspect, a vehicle control method for a vehicle equipped with an internal combustion engine is provided. The vehicle includes a high-pressure fuel pump, a delivery pipe that stores high pressure fuel pressurized by the high-pressure fuel pump, a fuel injection valve that injects fuel stored in the delivery pipe, and a fuel pressure sensor that detects a pressure of the fuel in the delivery pipe. The control method includes measuring an amount of time elapsed since a main switch of the vehicle was turned off; retaining information even when the main switch is turned off so that a power supply is stopped; when the elapsed amount of time reaches a specified amount of time while the main switch is off, obtaining a fuel pressure using the fuel pressure sensor, and performing a rationality check for determining whether the obtained fuel pressure is within a normal range on a condition that a performance condition is met; and making the performance condition strict in a case in which an obtained index value of a vehicle outside temperature, that is obtained when the elapsed amount of time reaches the specified amount of time and the determining section is activated, is higher than a stored index value of the vehicle outside temperature, that is stored in the nonvolatile memory before the main switch is turned off so that the power supply is stopped, as compared to a case in which the obtained index value of the vehicle outside temperature is not higher than the stored index value of the vehicle outside temperature.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of live methods, apparatuses, and or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well know n to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for a vehicle according to an embodiment will now be described with reference to FIGS. 1 to 7.

Figure 1:
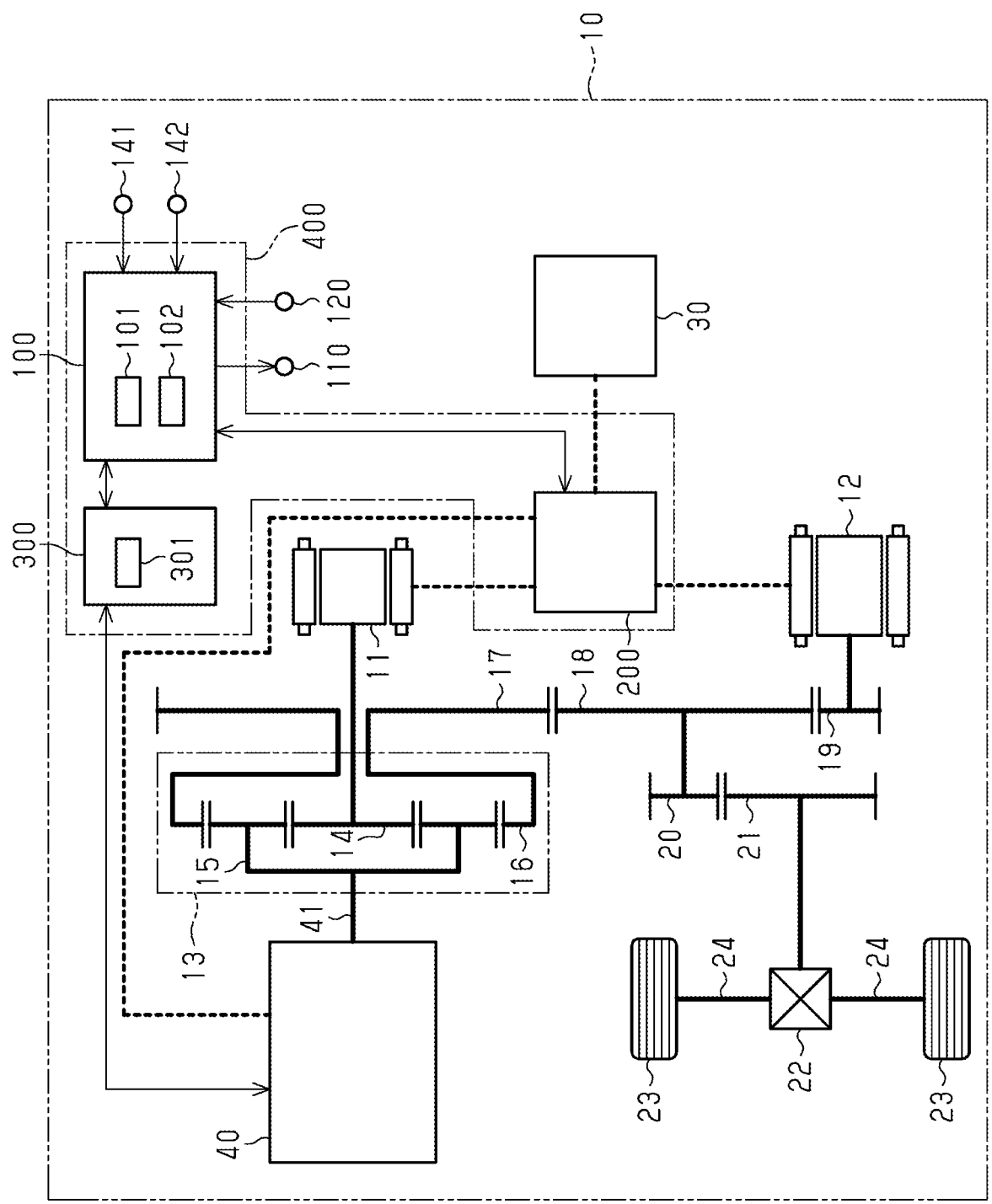
FIG. 1 is a schematic diagram showing the relationship between a controller and a hybrid vehicle.

As shown in FIG. 1, the vehicle 10 includes an internal combustion engine 40. The vehicle 10 also includes a battery 30, which stores power. The vehicle 10 further includes a first motor-generator 11 and a second motor-generator 12. The first motor-generator 11 and the second motor-generator 12 are each a motor that generates a driving force in response to supply of power from the battery 30 and also functions as a generator that receives external force to generate power with which the battery 30 is charged.

The vehicle 10 is provided with a planetary gear mechanism 13, which includes three rotational elements: a sun gear 14, a planetary carrier 15, and a ring gear 16. The planetary carrier 15 is coupled to a crankshaft 41, which is the output shaft of the internal combustion engine 40. The sun gear 14 of the planetary gear mechanism 13 is coupled to the first motor-generator 11. The ring gear 16 is provided integrally with a counter drive gear 17. The counter drive gear 17 is meshed with a counter driven gear 18. The second motor-generator 12 is coupled to a reduction gear 19, which is meshed with the counter driven gear 18.

The counter driven gear 18 is coupled to a final drive gear 20 so as to rotate integrally with the final drive gear 20. The final drive gear 20 is meshed with a final driven gear 21. The final driven gear 21 is coupled to drive shafts 24 of wheels 23 via a differential mechanism 22.

The vehicle 10 is equipped with a controller 400, which controls the vehicle 10. The controller 400 includes a system control unit 100, a power control unit 200, and an engine control unit 300.

The system control unit 100 is connected to the power control unit 200. The first motor-generator 11 and the second motor-generator 12 are connected to the battery 30 via the power control unit 200. The power control unit 200 includes a controlling section, an inverter, and a converter. On the basis of commands from the system control unit 100, the power control unit 200 regulates the amount of power supplied to the first motor-generator 11 and the second motor-generator 12 from the battery 30, and the amount of power from the first motor-generator 11 and the second motor-generator 12 with which the battery 30 is charged.

The system control unit 100 is also connected to the engine control unit 300, which controls the internal combustion engine 40. The engine control unit 300 controls the internal combustion engine 40 on the basis of commands front the system control unit 100.

Next, the fuel supply systems of the internal combustion engine 40 will now be described with reference to FIG. 2.

Figure 2:
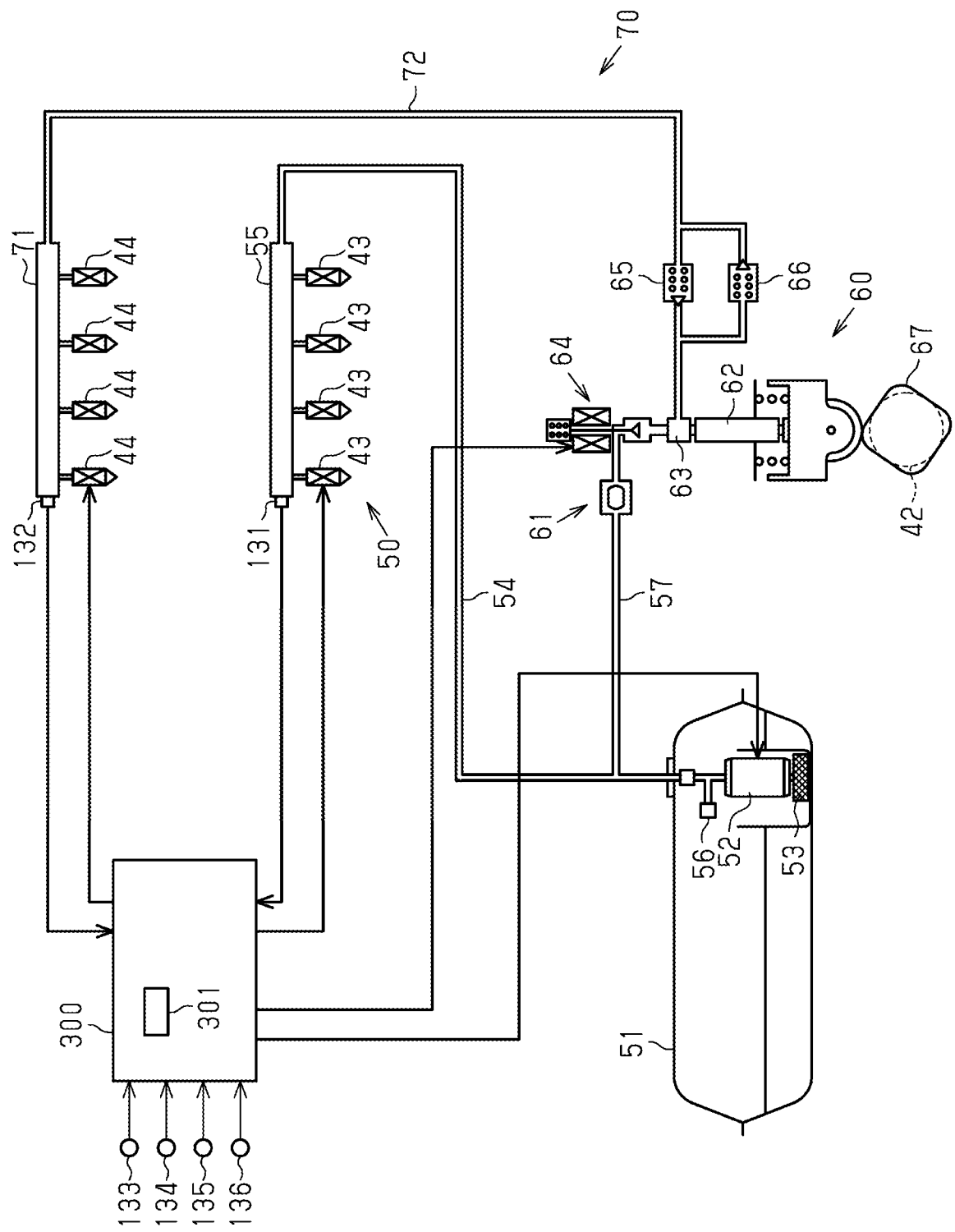
FIG. 2 is a schematic diagram showing the configuration of the fuel supply system of the internal combustion engine.

As shown in FIG. 2, the fuel supply systems of the internal combustion engine 40 include port injection valves 43 and direct injection valves 44. The port injection valves 43 inject fuel into intake air flowing in the intake ports of the internal combustion engine 40. The direct injection valves 44 inject fuel into intake air in the cylinders of the internal combustion engine 40. The internal combustion engine 40 is an inline four-cylinder engine. The internal combustion engine 40 has four port injection valves 43 and four direct injection valves 44.

The internal combustion engine 40 includes two fuel supply systems. The internal combustion engine 40 includes a low-pressure fuel supply system 50, which supplies fuel to the port injection valves 43, and a high-pressure fuel supply system 70, which supplies fuel to the direct injection valves 44.

A fuel tank 51 incorporates a feed pump 52. The feed pump 52 pumps fuel stored in the fuel tank 51 via a filter 53, which filters out impurities in live fuel. The feed pump 52 supplies the fuel to a low-pressure side delivery pipe 55 via a low-pressure fuel passage 54. The low-pressure side delivery pipe 55 is connected to the port injection valves 43 of the respective cylinders. The low-pressure side delivery pipe 55 has a low-pressure side fuel pressure sensor 131. The low-pressure side fuel pressure sensor 131 detects the pressure of fuel stored in the low-pressure side delivery pipe 55, that is, the fuel pressure on the low-pressure side, which is the pressure of the fuel supplied to the respective port injection valves 43. The low-pressure side fuel pressure sensor 131 presents a fuel pressure as a gauge pressure, which is defined with reference to the atmospheric pressure.

A pressure regulator 56 is provided in the low-pressure fuel passage 54 in the fuel tank 51. When the pressure of fuel in the low-pressure fuel passage 54 exceeds a specified regulator set pressure, the pressure regulator 56 opens to discharge fuel in the low-pressure fuel passage 54 to the fuel tank 51. In this manner, the pressure regulator 56 maintains the pressure of fuel supplied to the port injection valves 43 at a value lower than or equal to the regulator set pressure.

The high-pressure fuel supply system 70 includes a mechanical high-pressure fuel pump 60. The low-pressure fuel passage 54 branches off the middle and is connected to the high-pressure fuel pump 60. The high-pressure fuel pump 60 is connected, via a connection passage 72, to a high-pressure side delivers pipe 71, to which the direct injection valves 44 of the respective cylinders are connected. The high-pressure fuel pump 60 is driven by the force of the internal combustion engine 40 to draw fuel from the low-pressure fuel passage 54, pressurize the fuel, and pressure-feed the fuel to the high-pressure side delivery pipe 71. The high-pressure side delivery pipe 71 is a delivery pipe that stores high-pressure fuel pressurized by the high-pressure fuel pump 60. The direct injection valves 44, which are connected to the high-pressure side delivery pipe 71, inject fuel stored in the high-pressure side delivery pipe 71.

The high-pressure fuel pump 60 includes a pulsation dampener 61, a plunger 62, a fuel chamber 63, an electromagnetic spill valve 64, a check valve 65, and a relief valve 66. The plunger 62 is reciprocated by a pump cam 67 provided on a camshaft 42 of the internal combustion engine 40. Reciprocation of the plunger 62 changes the volume of the fuel chamber 63. The pump cam 67 is provided on the intake side camshaft 42, which drives the intake valves.

When energized, the electromagnetic spill valve 64 is closed to shut off the flow of fuel between the fuel chamber 63 and the low-pressure fuel passage 54. When the electromagnetic spill valve 64 has ceased being energized, it is opened to allow fuel to flow between the fuel chamber 63 and the low-pressure fuel passage 54. The check valve 65 prohibits backflow of fuel from the high-pressure side delivery pipe 71 to the fuel chamber 63, while allowing fuel to be discharged to the high-pressure side delivery pipe 71 from the fuel chamber 63. The relief valve 66 is provided in a passage that bypasses the check valve 65 to protect the high-pressure fuel supply system 70. When the pressure in the vicinity of the high-pressure side delivery pipe 71 is excessively high, the relief valve 66 opens to allow for backflow of fuel to the fuel chamber 63.

When the plunger 62 moves in a direction of increasing the volume of the fuel chamber 63, the high-pressure fuel pump 60 opens the electromagnetic spill valve 64 to draw fuel in the low-pressure fuel passage 54 into the fuel chamber 63. When the plunger 62 moves in a direction of reducing the volume of the fuel chamber 63, the high-pressure fuel pump 60 closes the electromagnetic spill valve 64 to pressurize the fuel drawn into the fuel chamber 63 and discharge the fuel to the high-pressure side delivery pipe 71.

In the following description, the movement of the plunger 62 in the direction of increasing the volume of the fuel chamber 63 is defined as descending of the plunger 62. The movement of the plunger 62 in the direction of reducing the volume of the fuel chamber 63 is defined as ascending of the plunger 62. In the internal combustion engine 40, the fuel discharge amount of the high-pressure fuel pump 60 is regulated by changing the ratio of the amount of time during which the electromagnetic spill valve 64 is open to the amount of time during which the plunger 62 ascends.

The branch passage 57, which branches off the low-pressure fuel passage 54 to be connected to the high-pressure fuel pump 60, is connected to the pulsation dampener 61, which dampens pressure pulsation of fuel caused by operation of the high-pressure fuel pump 60. The pulsation dampener 61 is connected to the fuel chamber 63 via the electromagnetic spill valve 64.

The high-pressure side delivery pipe 71 has a high-pressure side fuel pressure sensor 132. The high-pressure side fuel pressure sensor 132 detects the pressure of fuel in the high-pressure side delivery pipe 71, that is, the fuel pressure on the high-pressure side, which is the pressure of the fuel supplied to the respective direct injection valves 44. The high-pressure side fuel pressure sensor 132 shows a fuel pressure as a gauge pressure, which is defined with reference to the atmospheric pressure.

The engine control unit 300 controls the internal combustion engine 40 by controlling the throttle valve and the ignition plugs in addition to the port injection valves 43, the direct injection valves 44, and the electromagnetic spill valve 64 of the high-pressure fuel pump 60.

As shown in FIG. 1, the system control unit 100 receives a detection signal indicating the amount the accelerator is depressed by the driver from an accelerator position sensor 142. The system control unit 100 also receives a detection signal indicating the vehicle speed, which is the traveling speed of the vehicle 10, from a vehicle speed sensor 141.

Furthermore, the controller 400 receives detection signals from various types of sensors. For example, as shown in FIG. 2, the engine control unit 300 is connected to an air flow meter 133, a crank position sensor 134, a cam position sensor 135, and a coolant temperature sensor 136, in addition to the low-pressure side fuel pressure sensor 131 and the high-pressure side fuel pressure sensor 132.

The air flow meter 133 detects the temperature of air drawn into the cylinders through the intake passage of the internal combustion engine 40 and the intake air amount, which is the mass of the drawn-in air. The crank position sensor 134 outputs a crank angle signal, which corresponds to changes in the rotational phase of the crankshaft 41. The cam position sensor 135 outputs a cam angle signal, which corresponds to changes in the rotational phase of the camshaft 42. The coolant temperature sensor 136 detects the coolant temperature, which is the temperature of the coolant of the internal combustion engine 40.

The engine control unit 300 receives detection signals of the above sensors. The engine control unit 300 calculates an engine rotational speed, which is the rotation speed of the crankshaft 41, on the basis of a detection signal of the rotational angle of the crankshaft 41 delivered by the crank position sensor 134.

A main switch 120 is connected to the system control unit 100. The power control unit 200 receives the current, the voltage, and the temperature of the battery 30. On the basis of input values of the current, the voltage, and the temperature, the power control unit 200 calculates a state-of-charge index value SOC, which is the ratio of the remaining charge to the charging capacity of the battery 30.

The engine control unit 300 and the power control unit 200 are each connected to the system control unit 100. The system control unit 100, the power control unit 200, and the engine control unit 300 exchange and share calculated information and information based on detection signals front the sensors.

On the basis of the information, the system control unit 100 outputs commands to the engine control unit 300 to control the internal combustion engine 40 through the engine control unit 300. Also, on the basis of the information, the system control unit 100 outputs commands to the power control unit 200 to control the first motor-generator 11 and the second motor-generator 12, and control charging of the battery 30 through the power control unit 200. In this manner, the system control unit 100 controls the vehicle 10 by outputting commands to the power control unit 200 and the engine control unit 300.

Subsequently, the control of the vehicle 10 executed by the controller 400 will be described.

The system control unit 100 calculates a requested output, which is a requested value of the output of the vehicle 10, based on the amount the accelerator is depressed and the vehicle speed. The system control unit 100 determines the torque distribution of the internal combustion engine 40, the first motor-generator 11, and the second motor-generator 12 in accordance with parameters such as the requested output and the state-of-charge index value SOC of the battery 30. The system control unit 100 further controls the output of the internal combustion engine 40 and powering operation/regenerative operation performed by the first motor-generator 11 and the second motor-generator 12.

For example, the system control unit 100 causes the first motor-generator 11 to operate as a starter motor when starting the internal combustion engine 40. Specifically, the system control unit 100 causes the first motor-generator 11 to rotate the sun gear 14 to rotate the crankshaft 41, thereby starting the internal combustion engine 40.

Also, the system control unit 100 switches the control when stopping the vehicle in accordance with the magnitude of the state-of-charge index value SOC. Specifically, when the state-of-charge index value SOC is greater than or equal to a threshold, the system control unit 100 stops the operation of the internal combustion engine 40 and does not drive the first motor-generator 11 and the second motor-generator 12. That is, the system control unit 100 stops the operation of the internal combustion engine 40 when the vehicle is stopped, thereby restricting idling. When the state-of-charge index value SOC of the battery 30 is less than the threshold, the system control unit 100 causes the internal combustion engine 40 to operate and uses the output of the internal combustion engine 40 to drive the first motor-generator 11. That is, the first motor-generator 11 is caused to function as a generator.

The system control unit 100 also switches the control when the vehicle 10 is traveling in accordance with the state-of-charge index value SOC. At the starting of the vehicle 10 or during traveling of the vehicle 10 under light load, if the state-of-charge index value SOC of the battery 30 is greater than or equal to the threshold, the system control unit 100 starts the vehicle 10 or causes the vehicle 10 to travel by using only the driving force of the second motor-generator 12. In this case, the internal combustion engine 40 is in a stopped state, and the first motor-generator 11 does not generate power. At the starting of the vehicle 10 or during traveling under light load of the vehicle 10, if the state-of-charge index value SOC of the battery 30 is less than the threshold, the system control unit 100 starts the internal combustion engine 40 to generate power using the first motor-generator 11 and charges the battery 30 with the generated power. At this time, the vehicle 10 travels by using some of the driving force of the internal combustion engine 40 and the driving force of the second motor-generator 12.

When the state-of-charge index value SOC of the battery 30 is greater than or equal to the threshold in a steady traveling state, the system control unit 100 causes the internal combustion engine 40 to operate in a state of a high operating efficiency and causes the vehicle 10 to travel mainly using the output of the internal combustion engine 40. At this time, the force of the internal combustion engine 40 is divided into a portion supplied to the driven wheels 23 and a portion supplied to the first motor-generator 11 by the planetary gear mechanism 13. Accordingly, the vehicle 10 travels while generating power with the first motor-generator 11. The system control unit 100 uses the generated power to drive the second motor-generator 12 and uses the force of the second motor-generator 12 to assist the force of the internal combustion engine 40. When the state-of-charge index value SOC of the battery 30 is less than the threshold in a steady traveling state, the system control unit 100 further increases the engine rotational speed. The system control unit 100 also uses the power generated by the first motor-generator 11 to drive the second motor-generator 12 and charges the battery 30 with the excess power.

During acceleration, the system control unit 100 increases the engine rotational speed and uses the power generated by the first motor-generator 11 to drive the second motor-generator 12, and accelerates the vehicle 10 using the force of the internal combustion engine 40 and the force of the second motor-generator 12.

During deceleration, the system control unit 100 stops the operation of the internal combustion engine 40. The system control unit 100 then causes the second motor-generator 12 to operate as a generator and charges the battery 30 with the generated power. The vehicle 10 uses the resistance produced through such power generation as a braking force. Such power generation control during the deceleration is referred to as regeneration control.

In this manner, the system control unit 100 stops the internal combustion engine 40 depending on the situation. That is, the system control unit 100 executes intermittent stop control to automatically stop and restart the internal combustion engine 40 depending on the situation.

The engine control unit 300 calculates a crank counter, which indicates the crank angle, or the rotational phase of the crankshaft 41. The engine control unit 300 calculates the crank counter on the basis of the crank angle signal, which is output by the crank position sensor 134, and a cam angle signal, which is output by the cam position sensor 135. The engine control unit 300 refers to the calculated crank counter to control the timing of fuel injection and ignition for each cylinder.

Specifically, the engine control unit 300 calculates a target fuel injection amount, which is a control target value for the fuel injection amount, on the basis of parameters such as the amount the accelerator is depressed, the vehicle speed, the intake air amount, the engine rotational speed, and the engine load factor. The engine load factor is the ratio of the inflow air amount per combustion cycle of one cylinder to a reference inflow air amount. The reference inflow air amount is the inflow air amount per combustion cycle of one cylinder when the opening degree of the throttle valve is maximized and is determined in accordance with the engine rotational speed. Basically, the engine control unit 300 calculates the target fuel injection amount such that the air-fuel ratio becomes the stoichiometric air-fuel ratio. The engine control unit 300 calculates control target values of the injection timing and fuel injection duration for the port injection valves 43 and live direct injection valves 44. The port injection valves 43 and the direct injection valves 44 are actuated to open by the engine control unit 300 in accordance with the control target values. Accordingly, an amount of fuel that corresponds to the operating state of the internal combustion engine 40 is injected from the injection valve and supplied to the combustion chambers of the internal combustion engine 40. The internal combustion engine 40 switches between fuel injection from the port injection valves 43 and fuel injection from the direct injection valves 44 depending on the operating state. Thus, in addition to the case in which fuel is injected from both of the port injection valves 43 and the direct injection valves 44, there is a case in which fuel is injected only from the port injection valves 43, and a case in which fuel is injected only from the direct injection valves 44.

The engine control unit 300 also executes fuel cutoff control in order to reduce the fuel consumption rate during deceleration, when the accelerator is not depressed (depressed in an amount of zero). In the fuel cutoff control, the injection of fuel is stopped, so that the supply of fuel to the combustion chambers of the internal combustion engine 40 is stopped. Further, the engine control unit 300 calculates the ignition timing, which is the timing of spark discharge by the ignition devices, and operates the ignition devices to ignite the air-fuel mixture.

The controller 400 performs the rationality check when the operation of the vehicle 10 is stopped by turning the main switch 120 off. The rationality check determines whether the high-pressure side fuel pressure sensor 132 can accurately detect the fuel pressure in the high-pressure side delivery pipe 71.

Thus, as shown in FIG. 1, the engine control unit 300 has a determining section 301, which performs the rationality check. The system control unit 100 includes a soak timer 101 and a nonvolatile memory 102.

While the main switch 120 is off, the soak timer 101 measures the amount of time elapsed since the main switch 120 was turned off. The soak timer 101 activates the controller 400 when the measured amount of time reaches the specified amount of time. When activated by the soak timer 101, the determining section 301 performs the rationality check if the operation of the vehicle 10 is stopped by turning the main switch 120 off.

The nonvolatile memory 102 is capable of retaining information when the main switch 120 is off and no power is supplied to the nonvolatile memory 102. The controller 400 causes the nonvolatile memory 102 to store information used in the rationality check.

When the main switch of the main switch 120 is off and the internal combustion engine 40 is in a stopped state, the high-pressure side delivery pipe 71 is sealed. Thus, due to the reduction in the volume of the fuel that accompanies the decrease in the fuel temperature from the point in time when the main switch 120 was turned off, the fuel pressure in the high-pressure side delivery pipe 71 decreases. However, as the pressure deceases due to the decrease in the temperature, some of the fuel evaporates, so that bubbles are generated in the fuel in the high-pressure side delivery pipe 71. If bubbles exist, the pressure is unlikely to decrease even if the temperature decreases. Then, at equilibrium, the fuel pressure converges to a value in the vicinity of 0 MPa.

After the main switch 120 is turned off in a state in which the fuel temperature is sufficiently high due to operation of the internal combustion engine 40, the controller 400 waits for the elapse of an amount of time required for the fuel pressure to decrease to a value in the vicinity of 0 MPa while measuring the amount of time elapsed using the soak tinier 101. The controller 400 is activated when the elapsed amount of time measured by the soak timer 101 reaches the specified amount of time, so that it is assumed that the fuel pressure has decreased to a value in the vicinity of 0 MPa. The determining section 301 detects the fuel pressure in the high-pressure side delivery pipe 71, using the high-pressure side fuel pressure sensor 132. The determining section 301 performs a rationality check for determining whether the obtained fuel pressure is within a normal range, which has a certain deviation above and below the 0 MPa, which serves as the central value.

When performing the rationality check, if the fuel pressure detected by the high-pressure side fuel pressure sensor 132 is not within the normal range, the determining section 301 determines that there is an anomaly in the high-pressure side fuel pressure sensor 132.

The vehicle 10 includes a warning display section 110. The warning display section 110 notifies vehicle occupants of an anomaly by displaying an icon as information indicating the existence of the anomaly. When there is an anomaly, the system control unit 100 causes the warning display section 110 to display the icon indicating the existence of the anomaly.

The rationality check will now be described with reference to FIGS. 3 to 7.

Figure 3:
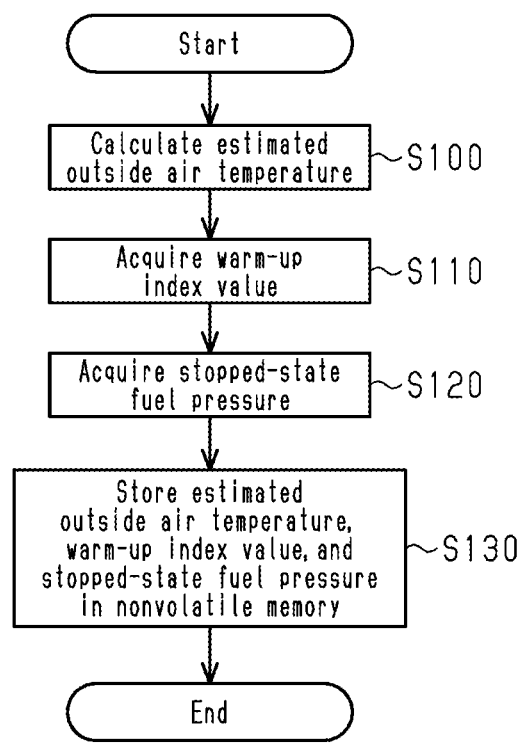
FIG. 3 is a flowchart showing the procedure of a routine for storing index values used in a rationality check in a nonvolatile memory.

The controller 400 executes the routine of FIG. 3 in preparation for the rationality check from when the main switch 120 is turned off until the power supply to the controller 400 is stopped by the execution of a process for stopping the system of the vehicle 10. Specifically, the routine shown in FIG. 3 is executed by the determining section 301 of the engine control unit 300 when the crankshaft 41 of the internal combustion engine 40 is slopped. This routine is executed on a condition that information indicating the existence of an anomaly in the high-pressure side fuel pressure sensor 132 is not stored in the nonvolatile memory 102.

When the routine is started, the determining section 301 calculates an estimated outside air temperature in step S100 as shown in FIG. 3. The estimated outside air temperature is calculated as an index value of the vehicle outside temperature during the time that the internal combustion engine 40 was operating during the current trip, which is until the main switch 120 is turned off. The term "trip" refers to a period during which the main switch 120 of the vehicle 10 is on, that is, the period during which the operation of the controller 400 of the vehicle 10 is continuing.

In step S100, the determining section 301 calculates, as the estimated outside air temperature, the lower one of the minimum value of the temperature of the intake air during the current trip and the coolant temperature at the first starting of the internal combustion engine 40 during the current trip.

Next, the determining section 301 acquires a warm-up index value in step S110. The warm-up index value indicates the extent of warm-up and increases as the extent of warm-up of the internal combustion engine 40 becomes higher. When the main switch 120 is on, and the controller 400 is operating, the warm-up index value is calculated by the system control unit 100. As the cumulative intake air amount increases, the heat generated by the internal combustion engine 40 tends to increase. Thus, as the cumulative intake air amount increases, the extent of warm-up becomes higher. As such, the system control unit 100 of the controller 400 calculates, as a warm-up index value, the cumulative intake air amount, which is a cumulative value of the intake air amount. In step S110, the determining section 301 acquires the warm-up index value calculated by the system control unit 100.

Next, the determining section 301 acquires a stopped-state fuel pressure in step S120. The stopped-state fuel pressure is a fuel pressure that is detected by the high-pressure side fuel pressure sensor 132 when the main switch of the main switch 120 is turned off and the operation of the internal combustion engine 40 is stopped.

In the subsequent step S130, the determining section 301 stores the estimated outside air temperature, the warm-up index value, and the stopped-state fuel pressure in the nonvolatile memory 102. When the estimated outside air temperature, the warm-up index value, and the stopped-state fuel pressure, which are used in the rationality check, are stored in the nonvolatile memory 102, the determining section 301 ends the routine.

Figure 4:
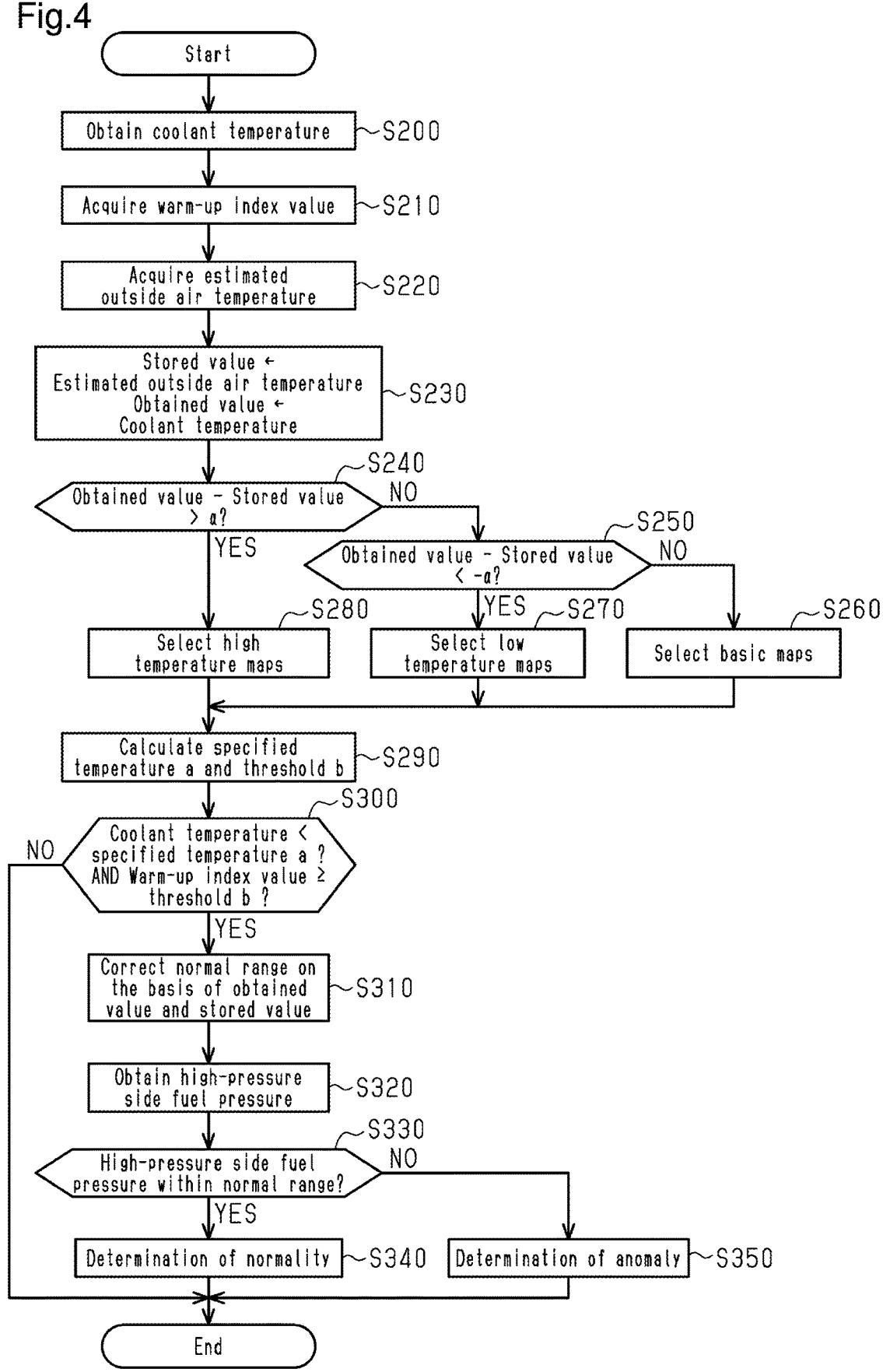
FIG. 4 is a flow chart showing the procedure of a routine related to the rationality check.

As described above, the soak timer 101 measures the amount of time elapsed since the main switch 120 was turned off while the main switch 120 is off. Since the controller 400 is activated when the elapsed amount of time measured by the soak timer 101 reaches the specified amount of time, the determining section 301 executes the routine shown in FIG. 4. The controller 400 has two or more specified amounts of time having different lengths. Specifically, the controller 400 has a first specified amount of time, a second specified amount of time, and a third specified amount having progressively increasing amounts of time from the first to the third specified amount of time. When the elapsed amount of time since live main switch 120 was turned off reaches Ute first specified amount of time, the controller 400 is activated, so that the routine shown in FIG. 4 is executed by the determining section 301. The specified amounts of time are in units of hours.

The soak timer 101 measures time on a condition that information indicating of an anomaly in the high-pressure side fuel pressure sensor 132 is not stored in the nonvolatile memory 102. Thus, the routine shown in FIG. 4 is also executed on the condition that information indicating an anomaly in the high-pressure side fuel pressure sensor 132 is not stored in the nonvolatile memory 102.

As shown in FIG. 4, the determining section 301 first obtains the coolant temperature, which is detected by the coolant temperature sensor 136, in step S200. That is, the determining section 301 obtains the current coolant temperature detected by the coolant temperature sensor 136.

Next, the determining section 301 acquires the warm-up index value stored in the nonvolatile memory 102 in step S210. After acquiring the coolant temperature and reading in the warm-up index value, the determining section 301 proceeds to step S220.

The determining section 301 acquires the estimated outside air temperature stored in the nonvolatile memory 102 in step S220. Next, in the process of step S230, the determining section 301 writes the acquired estimated outside air temperature to a stored value, thereby updating the stored value. The determining section 301 writes the coolant temperature obtained in the process of step S200 to an obtained value, thereby updating the obtained value. The obtained value is used in the process of step S310 discussed below as an index value of the vehicle outside temperature obtained w hen live elapsed amount of time reaches the specified amount of time and the determining section 301 is activated. The stored value is used in the process of step S310 as an index value of the vehicle outside temperature that is stored in the nonvolatile memory 102 before the main switch 120 is turned off so that the operation of the controller 400 is stopped.

Next, the determining section 301 determines, in the process of step S240, whether the value obtained by subtracting the stored value from the obtained value is greater than a threshold $\alpha$. This process is configured to determine whether the vehicle outside temperature has become higher than the vehicle outside temperature in the previous trip. The threshold $\alpha$ is used to determine whether the difference between the vehicle outside temperature in the previous trip and the current vehicle outside temperature is large to an extent that requires a change in the performance condition for the rationality check.

If the difference obtained by subtracting the stored value from the obtained value is less than or equal to the threshold $\alpha$ (step S240: NO), the determining section 301 proceeds to step S250. In the process of step S250, the determining section 301 determines whether the difference obtained by subtracting the stored value from the obtained value is less than a threshold $-\alpha$. This process is configured to determine whether the vehicle outside temperature has become lower than the vehicle outside temperature in the previous trip.

In the process of step S250, if the difference obtained by subtracting the stored value from the obtained value is greater than or equal to the threshold $-\alpha 0$ (step S250: NO), the determining section 301 proceeds to step S260.

In the process of step S260, the determining section 301 selects basic maps as calculation maps used in the process of step S290. In the process of step S290, a specified temperature a and a threshold b are calculated as thresholds used to determine whether the performance condition for the rationality check is met. The specified temperature a is a threshold of the coolant temperature, and the threshold b is a threshold of the warm-up index value. A basic map for calculating the specified temperature a and a basic map for calculating the threshold b are prepared.

Figure 5:
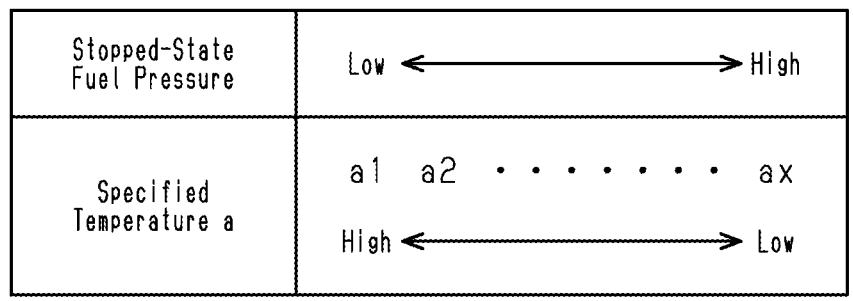
FIG. 5 is an explanatory diagram of the content of a map for calculating a specified temperature.

As shown in FIG. 5, the map for calculating the specified temperature a is a calculation map that receives the stopped-state fuel pressure, and outputs the specified temperature a that corresponds to the stopped-state fuel pressure. This map outputs a lower value of the specified temperature a for a higher value of the stopped-state fuel pressure. In FIG. 5, an index x is affixed to the specified temperature a. The symbol "ax" represents each value of the specified temperature a, which is an output value corresponding to the stopped-state fuel pressure. From the value that is output when the stopped-state fuel pressure is low, the values of the specified temperature a are represented by a1, a2, . . . , ax in that order.

Figure 6:
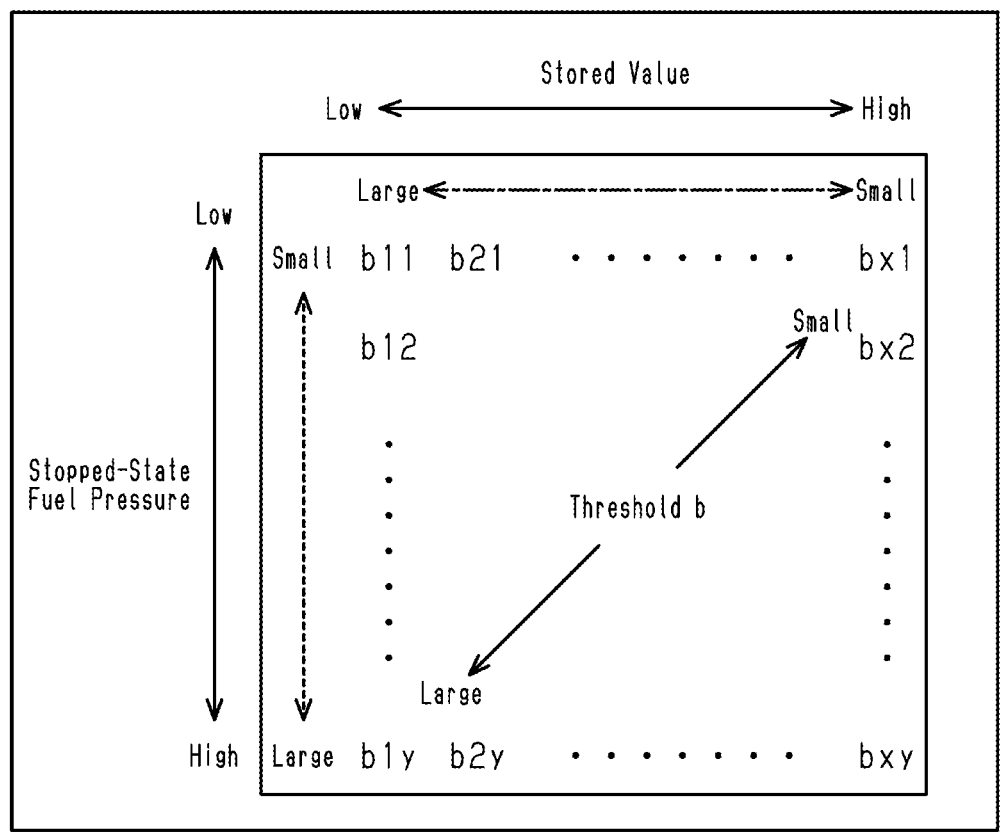
FIG. 6 is an explanatory diagram of the content of a map for calculating a threshold.

As shown in FIG. 6, the map for calculating the threshold b is a calculation map that receives the stopped-state fuel pressure and the stored value, and outputs the threshold b that corresponds to the combination of the received values. This map outputs a larger value of the threshold b for a higher value of the stopped-state fuel pressure. This tendency is indicated by a dashed arrow in FIG. 6. Also, a smaller value of the threshold b is output for a higher value of the stored value, which is the estimated outside air temperature stored in the nonvolatile memory 102. This tendency is indicated by a long-dash short-dash line arrow in FIG. 6. In FIG. 6, an index x and an index y are affixed to the threshold b. The index x corresponds to the value of the stored value, and the index y corresponds to the value of the stopped-state fuel pressure. Each value of the threshold b, which is an output value, is represented by bxy. This map stores values of the threshold b corresponding to the lowest value of the stopped-state fuel pressure. Specifically, from five value that is output when five stored value is low, the values of the threshold b corresponding to the lowest value of the stopped-state fuel pressure are represented by b11, b21, . . . , bx1 in that order. This map also stores values of the threshold b corresponding to the lowest value of five stored value. Specifically, from the value that is output when the stopped-stopped-state fuel pressure is low, the values of the threshold b corresponding to the lowest value of the stored value are represented by b11, b12, . . . , b1y in that order. As indicated by the solid arrows in the center of FIG. 6, the threshold b, which is calculated using the basic map, has a smaller value for a lower value of the stopped-state fuel pressure and a larger value of the stored value, and has a larger value for a higher value of the stopped-state fuel pressure and a smaller value of the stored value. The values of the threshold b stored in the map of FIG. 6 decrease toward the top right corner and increase toward the bottom left corner.

The values ax of the specified temperature a and the values bxy of the threshold b, which are stored in the basic maps, are set on the basis of the results of tests performed in advance, such that it is possible to determine whether the condition is suitable for performing the rationality check in a state in which the vehicle outside temperature is not significantly different from the vehicle outside temperature in the previous trip.

The specified temperature a is lower than a warm-up completion temperature, which is the threshold for determining whether the warm-up of the internal combustion engine 40 has been completed. When the warm-up completion temperature is, for example, 80° C., the specified temperature a is, for example, 50° C. The threshold b of the warm-up index value is set such that, when the warm-up index value is greater than or equal to the threshold b, it is determined that the fuel temperature has been increased to an extent that allows for the amount of temperature decrease required for performing the rationality check. In the process of step S300, which will be discussed below, the determining section 301 determines whether the performance condition for live rationality check is met. In the controller 400, the performance condition is the logical conjunction of the coolant temperature obtained in the process of step S200 being less than the specified temperature a, and the warm-up index value acquired in the process of step S210 being greater than or equal to the threshold b. That is, the performance condition is designed to confirm that the fuel temperature when the main switch 120 is turned off is relatively high, and that the current fuel temperature has decreased a certain extent. Therefore, if the performance condition is met, it is assumed that the fuel temperature has decreased a certain extent from a state of being relatively high, so that the condition is suitable for performing the rationality check.

After selecting the basic maps through the process of step S260, the determining section 301 proceeds to the process of step S290. If the difference obtained by subtracting the stored value from the obtained value is greater than the threshold α (step S240: YES), the determining section 301 proceeds to step S280. In the process of step S280, the determining section 301 selects high temperature maps as calculation maps used in the process of step S290. A high temperature map for calculating the specified temperature a and a high temperature map for calculating the threshold b are prepared.

Like the basic map for calculating the specified temperature a, the high temperature map for calculating the specified temperature a is a calculation map that receives the stopped-state fuel pressure, and outputs the specified temperature a that corresponds to the stopped-state fuel pressure. This high temperature map also outputs a lower value of the specified temperature a for a higher value of the stopped-state fuel pressure. However, in the high temperature map, the values ax of the specified temperature a, which are output values corresponding to the stopped-state fuel pressure, are smaller than the values ax stored in the basic map. That is, when the same stopped-state fuel pressure is input, the specified temperature a that is calculated using the high temperature map is lower than the specified temperature a that is calculated using the basic map.

Like the basic map for calculating the threshold b, the high temperature map for calculating the threshold b is a calculation map that receives the stopped-state fuel pressure and the stored value, and outputs the threshold b that corresponds to the combination of the received values. This high temperature map also outputs a larger value of the threshold b for a higher value of the stopped-state fuel pressure. Also, this high temperature map outputs a smaller value of the threshold b for a higher value of the stored value. However, in the high temperature map, the values bxy of the threshold b, which are output values corresponding to combinations of the stopped-state fuel pressure and the stored value, are larger than the values bxy stored in the basic map. That is, the threshold b that is calculated using the high temperature map is higher than the threshold b that is calculated using the basic map.

After selecting the high temperature maps through the process of step S280, the determining section 301 proceeds to the process of step S290. In the process of step S250, if the difference obtained by subtracting the stored value from the obtained value is less than the threshold −α (step S250: YES), the determining section 301 proceeds to step S270.

In the process of step S270, the determining section 301 selects low temperature maps as calculation maps used in the process of step S290. A low temperature map for calculating the specified temperature a and a low temperature map for calculating the threshold b are prepared.

Like the basic map for calculating the specified temperature a, the low temperature map for calculating the specified temperature a is a calculation map that receives the stopped-state fuel pressure, and outputs the specified temperature a that corresponds to the stopped-state fuel pressure. This low temperature map also outputs a lower value of the specified temperature a for a higher value of the stopped-state fuel pressure. However, in the low temperature map, the values ox of the specified temperature a, which are output values corresponding to the stopped-state fuel pressure, are larger than the values ax stored in the basic map. That is, when the same stopped-state fuel pressure is input, the specified temperature a that is calculated using the low temperature map is higher than the specified temperature a that is calculated using the basic map.

Like the basic map for calculating the threshold b, the low temperature map for calculating the threshold b is a calculation map that receives the stopped-state fuel pressure and the stored value, and outputs the threshold b that corresponds to the combination of the received values. This low temperature map also outputs a larger value of the threshold b for a higher value of the stopped-state fuel pressure. Also, this low temperature map outputs a smaller value of the threshold b for a higher value of the stored value. However, in the low temperature map, the values bxy of the threshold b, which are output values corresponding to combinations of the stopped-state fuel pressure and the stored value, are smaller than the values bxy stored in the basic map. That is, the threshold b that is calculated using the low temperature map is lower than the threshold b that is calculated using the basic map.

After selecting the low temperature maps through the process of step S270, the determining section 301 proceeds to the process of step S290. In the process of step S290, the determining section 301 calculates the specified temperature a and the threshold b as thresholds used to determine whether the performance condition for the rationality check is met using the selected calculation maps through the processes of steps S240 to S280.

Specifically, the determining section 301 acquires the stopped-state fuel pressure stored in the nonvolatile memory 102, and inputs it into the calculation map for calculating the specified temperature a, thereby calculating the specified temperature a. Also, the determining section 301 inputs the stopped-state fuel pressure and the stored value that has been updated in step S230 into the calculation map for calculating the threshold b, thereby calculating the threshold b. The determining section 301 then proceeds to the process of step S300.

In the process of step S300, the determining section 301 determines whether the performance condition for the rationality check is met. In the controller 400, the performance condition is the logical conjunction of the coolant temperature obtained in the process of step S200 being less than the specified temperature a, and the warm-up index value acquired in the process of step S210 being greater than or equal to the threshold b.

When the performance condition is met, that is, when the coolant temperature is lower than the specified temperature a and the warm-up index value is greater than or equal to the threshold b (step S300: YES), the determining section 301 proceeds to step S310. The determining section 301 then performs the rationality check, which includes the processes from step S310 to step S350.

When the performance condition is not met (step S300: NO), the determining section 301 ends the current routine without performing the rationality check. In this case, the operation of the controller 400 is stopped. Thereafter, when the elapsed amount of time since the main switch 120 was turned off, which is continuously measured by the soak timer 101, reaches the second specified amount of time, which is the next specified amount of time, the controller 400 is activated to execute this routine. The same applies to a case in which the controller 400 is activated and the negative determination is made in the process of step S300 when the elapsed amount of time measured by the soak timer 101 reaches the second specified amount of time. Then, when the elapsed amount of time reaches the third specified amount of time, the controller 400 is activated to execute this routine.

Figure 7:
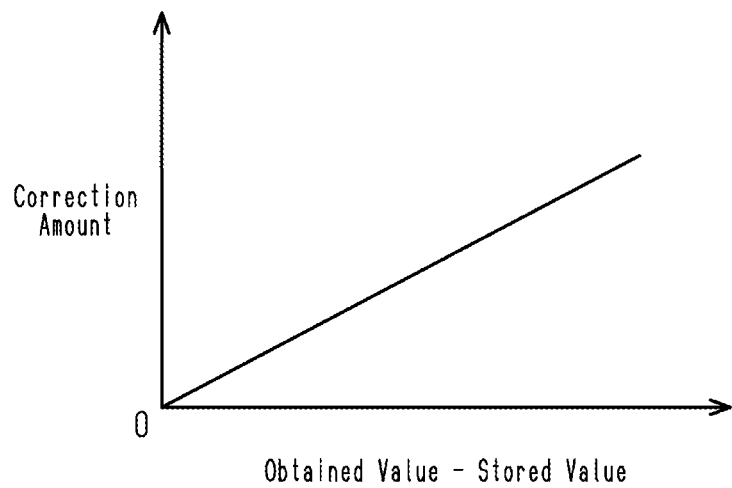
FIG. 7 is a graph showing the relationship between a correction amount in a correction process and a difference obtained by subtracting a stored value of the vehicle outside temperature from an obtained value of the vehicle outside temperature.

After starting the rationality check, in the process of step S310, the determining section 301 first executes a correction process for correcting the normal range used in the rationality check on the bases of the obtained value and the stored value, which have been updated through the process of step S230. Specifically, as shown in FIG. 7, in the correction process, the determining section 301 calculates a greater value of a correction amount as the difference obtained by subtracting the stored value from the obtained value increases, and corrects the normal range toward the high-pressure side by the correction amount. That is, the determining section 301 adds the correction amount to both of the upper limit and the lower limit of the normal range to shift the normal range toward the high-pressure side. This increases the median of the correction range from 0 MPa by the correction amount.

When the normal range is corrected through the correction process of S310, the determining section 301 obtains, in the process of step S320, the fuel pressure in the high-pressure side delivery pipe 71, which has been detected by the high-pressure side fuel pressure sensor 132.

Then, in the subsequent step S330, the determining section 301 determines whether the obtained fuel pressure on the high-pressure side is within the corrected normal range. When the fuel pressure on the high-pressure side is within the corrected normal range (step S330: YES), the determining section 301 proceeds to step S340. In the process of step S340, the determining section 301 concludes the determination that the high-pressure side fuel pressure sensor 132 is operating normally. The determining section 301 then resets the elapsed amount of time by stopping measuring time with the soak timer 101 and ends the rationality check.

When the fuel pressure on the high-pressure side is out of the corrected normal range (step S330 NO), the determining section 301 proceeds to step S350. In the process of step S350, the determining section 301 concludes the determination that there is an anomaly in the high-pressure side fuel pressure sensor 132. As an anomaly determination process, the determining section 301 causes the nonvolatile memory 102 to store information indicating that there is an anomaly. The determining section 301 then resets the elapsed amount of time by stopping measuring time with the soak timer 101 and ends the rationality check.

When the nonvolatile memory 102 stores information that indicates that there is an anomaly, the system control unit 100 causes the warning display section 110 to display an icon that indicates the existence of the anomaly to notify the occupants of the existence of the anomaly. The information indicating that there is an anomaly, which is stored in the nonvolatile memory 102, is deleted from the nonvolatile memory 102 when the anomaly is eliminated, for example, at a repair shop. Therefore, after it is determined that there is an anomaly through the rationality cheek, and the information indicating the anomaly is stored in the nonvolatile memory 102, the wanting display section 110 continues displaying the icon indicating the existence of the anomaly until the information is deleted through repair.

When the process of step S340 or step S350 is finished, the determining section 301 ends the current routine. Accordingly, the operation of the controller 400 is stopped. After the rationality check is completed by the process of step S340 or step S350, the soak timer 101 does not activate the controller 400 as long as the main switch 120 remains off. That is, the controller 400 does not execute the rationality check while a state in which the main switch 120 is off is continuing after the rationality check is completed once.

An operation of the present embodiment will now be described.

Once the internal combustion engine 40 starts operating, the high-pressure fuel pump 60 starts pressurization. Accordingly, the high-pressure side fuel pressure, which is the fuel pressure in the high-pressure side delivery pipe 71, increases to the target fuel pressure. While the internal combustion engine 40 is operating, the engine control unit 300 controls the fuel pressure.

As the internal combustion engine 40 operates, the fuel temperature, which is the temperature of the fuel in the high-pressure side delivery pipe 71, increases together with the coolant temperature. When the coolant temperature increases to or exceeds a warm-up determination temperature, the warm-up of the internal combustion engine 40 is completed. At this time, the radiator starts radiating heat. Thus, the increase in the coolant temperature and the increase in the fuel temperature peak when reaching certain levels due to the cooling effect of the coolant and the heat radiating effect of the radiator.

Fuel having a temperature that has increased due to the operation of the internal combustion engine 40 is stored in the high-pressure side delivery pipe 71 at a high pressure, and is then injected from the direct injection valves 44.

Thereafter, when the main switch 120 is turned off, power supply to the controller 400 is slopped, so that the operation of the system of the vehicle 10 and the operation of the internal combustion engine 40 are stopped. When the operation of the internal combustion engine 40 is stopped, the heat due to combustion of fuel stops being generated, so that the coolant temperature and the fuel temperature gradually decrease. Also, while the internal combustion engine 40 is in a stopped state, the high-pressure side delivery pipe 71 is sealed, so that the volume of the fuel stored in the high-pressure side delivery pipe 71 decreases as the fuel temperature decreases. Accordingly, the high-pressure side fuel pressure decreases.

As described above with reference to FIG. 3, the determining section 301 of the controller 400 stores, in the nonvolatile memory 102, the estimated outside air temperature as an index value of the vehicle outside temperature when the main switch 120 is turned off. Accordingly, the estimated outside air temperature is stored in the nonvolatile memory 102 as an index value of the vehicle outside temperature. At this time, the warm-up index value and the stopped-state fuel pressure are stored in the nonvolatile memory 102 together with the estimated outside air temperature.

Also, when the main switch 120 is turned off, the soak timer 101 starts measuring time. Then, when the elapsed amount of time measured by the soak timer 101 reaches the first specified amount of time, the controller 400 is activated. The determining section 301 executes the routine that has been described with reference to FIG. 4, thereby obtaining the coolant temperature as an index value of the vehicle outside temperature.

If the vehicle outside temperature has not changed since the operation of the internal combustion engine 40 in the immediately preceding trip, all the heat generated in the immediately preceding trip has been radiated, and the coolant temperature and the fuel temperature have converged to values substantially equal to the vehicle outside temperature. Also, the fuel temperature has sufficiently decreased, and volume of the fuel has sufficiently decreased. Accordingly, the high-pressure side fuel pressure has converged to 0 MPa.

In this case, the basic maps are selected through the processes of steps S240 to S280 (S260). At this time, the coolant temperature increased to or exceeded the warm-up determination temperature and the warm-up of the internal combustion engine 40 was completed in the immediately preceding trip. Thus, the warm-up index value stored in the nonvolatile memory 102 is greater than or equal to the threshold b. Also, the coolant temperature has become lower than the specified temperature a and dropped to a value substantially equal to the vehicle outside temperature. Thus, the performance condition for the rationality check is met (step S300: YES), so that the determining section 301 performs the rationality check.

In the rationality check, the determining section 301 calculates the correction amount on the basis of the stored value, which is an index value of the vehicle outside temperature stored in the nonvolatile memory 102, and the obtained value, which is the newly obtained index value of the vehicle outside temperature. In this case, there is little difference between the stored value and the obtained value. Accordingly, the correction amount is substantially 0.

Thus, the correction through the correction process is scarcely executed, so that the rationality check is pet formed by using a referential normal range as the normal range without changing it. Since the high-pressure side fuel pressure has converged to 0 MPa, the pressure detected by the high-pressure side fuel pressure sensor 132 remains within the normal range if the high-pressure side fuel pressure sensor 132 is operating normally, so that determination of the normal state is made.

If the vehicle outside temperature has changed and increased while live main switch 120 is off, the coolant temperature and the fuel temperature can be unexpectedly high when the specified amount of time has elapsed. In such a case, an erroneous determination may be made if the referential normal range keeps being used.

For example, a case is now considered in which the vehicle 10 has traveled at night in the winter and is parked in a garage, and the temperature in the garage increases due to the temperature increase during the next day. In this case, the vehicle outside temperature may change with the main switch 120 turned off. In this case, the coolant temperature and the fuel temperature become higher than the stored value, which is an index value of the vehicle outside temperature stored in the nonvolatile memory 102. As a result, the high-pressure side fuel pressure does not decrease to a value in the vicinity of 0 MPa, so that the high-pressure side fuel pressure may be out of the referential normal range. Thus, if the rationality check is performed by using the referential normal range as is, an erroneous determination of an anomaly is made despite the fact that the high-pressure side fuel pressure sensor 132 is operating normally.

However, the controller 400 obtains the coolant temperature as an index value of the vehicle outside temperature in the process of step S200. On the basis of the magnitude of the difference obtained by subtracting the stored value, which is an index value of the vehicle outside temperature stored in the nonvolatile memory 102, from the obtained value, which is an index value of the obtained vehicle outside temperature, the calculation maps are switched to the ones for calculating the thresholds for determining whether the performance condition for the rationality check is met (steps S240 to S280).

Specifically, if the difference obtained by subtracting the stored value from the obtained value is greater than the threshold α, the high temperature maps are selected (step S280). The specified temperature a and the threshold b, which are calculated using the high temperature maps, are used to determine whether the performance condition for the rationality check is met (S300). The specified temperature a that is calculated using the high temperature map is lower than the specified temperature a that is calculated using the basic map. Also, the threshold b that is calculated using the high temperature map is higher than the threshold b that is calculated using the basic map. Accordingly, the requirements for the performance condition to be met include the coolant temperature being low and the warm-up index value being high as compared to the case in which it is determined whether the performance condition is met on the basis of the specified temperature a and the threshold b that are calculated using the basic maps without switching the maps. That is, the performance condition for the rationality check becomes stricter. The performance condition is thus less likely to be determined to be met.

Also, if the performance condition is met (step S300: YES), the controller 400 executes the correction process for correcting the normal range by calculating the correction amount on the basis of the obtained value, which is an index value of the vehicle outside temperature obtained in the process of step S200 and the stored value, which is an index value of the vehicle outside temperature stored in the nonvolatile memory 102 (step S310).

Specifically, the correction amount that corresponds to the difference obtained by subtracting the stored value from the obtained value is calculated. The normal range is corrected by the calculated correction amount. Accordingly, the corrected normal range is on the high-pressure side of the referential normal range.

That is, the controller 400 shifts the normal range toward the high-pressure side when the index value of the vehicle outside temperature obtained when the determining section 301 is activated while the main switch 120 is off is higher than the index value of the vehicle outside temperature, which is stored in the nonvolatile memory 102, and it is assumed that the vehicle outside temperature has increased from when the main switch 120 was turned off. The fuel pressure is thus likely to remain in the normal range in the rationality check even if the vehicle outside temperature increases while the main switch 120 is off.

If the difference obtained by subtracting the stored value from the obtained value is less than the threshold $-\alpha$, the low-temperature maps are selected (step S270). The specified temperature a and the threshold b, which are calculated using the low temperature maps, are used to determine whether the performance condition for the rationality check is met (S300). The specified temperature that is calculated using the low temperature map is higher than the specified temperature a that is calculated using the basic map. Also, the threshold b that is calculated using the high temperature map is lower than the threshold b that is calculated using the basic map. That is, in this case, the performance condition is easily determined to be met as compared to a case in which it is determined whether the performance condition is met on the basis of the specified temperature a and the threshold b that are calculated using the basic maps without switching the maps.

The present embodiment has the following advantages.

(1) When the elapsed amount of tune measured by the soak timer 101 reaches the specified amount of time, the rationality check is performed on the assumption that the high-pressure side fuel pressure has decreased to the vicinity of the reference pressure, which is the median of the normal range.

Therefore, in order to perform the rationality check, the fuel temperature needs to decrease a certain extent from a state of being relatively high, and the reduction in the volume of the fuel stored in the high-pressure side delivery pipe 71 due to the decrease in the temperature of the fuel needs to have progressed sufficiently to cause the high-pressure side fuel pressure to decrease to the vicinity of the reference pressure.

The performance condition for the rationality check is the logical conjunction of the warm-up index value, which is correlated with the fuel temperature when the main switch 120 is turned off, being greater than or equal to the threshold b, and the coolant temperature, which is correlated with the fuel temperature when the elapsed amount of time reaches the specified amount of time, being lower than the specified temperature a. That is, the rationality check is performed on a condition that it is assumed that the fuel temperature has decreased a certain extent from a state of being relatively high, in addition to the condition that the elapsed amount of time has reached the specified amount of time. Thus, the rationality check is performed after accurately confirming that the condition suitable for performance of the rationality check is met because the reduction in the volume of the fuel stored in the high-pressure side delivery pipe 71 has progressed.

(2) What the index value of the vehicle outside temperature obtained when the determining section 301 is activated while the main switch 120 is off is higher than the index value of the vehicle outside temperature stored in the nonvolatile memory 102, it is assumed that the vehicle outside temperature has become higher than the vehicle outside temperature when the main switch 120 was turned off. In this case, the performance condition for the rationality check is made stricter. Thus, when a reduction in the volume of fuel due to a temperature decrease of the fuel and an accompanying decrease in the fuel pressure cannot be expected, so that an erroneous determination may be made, the performance condition is not easily met. That is, the controller 400 prevents an erroneous determination from being made due to an increase in the vehicle outside temperature despite the normal operation of the high-pressure side fuel pressure sensor 132.

(3) When the index value of the vehicle outside temperature obtained when the determining section 301 is activated while the main switch 120 is off is lower than the index value of the vehicle outside temperature stored in the nonvolatile memory 102, it is assumed that the vehicle outside temperature has become lower than the vehicle outside temperature when the main switch 120 was turned off. In this case, the performance condition for the rationality check is relaxed. When the vehicle outside temperature is lower than the vehicle outside temperature when the main switch 120 was turned off, the volume of the fuel is likely to be reduced due to the decrease in the temperature of the fuel, and an accompanying decrease in the fuel pressure is likely to occur. Thus, the rationality check is performed even if the performance condition is relaxed. Taking the above-described factors into consideration, the controller 400 relaxes the performance condition by selecting the low-temperature maps when the vehicle outside temperature is assumed to be lower than the vehicle outside temperature when the main switch 120 was turned off. This ensures opportunities for performance of the rationality check.

(4) The controller 400 shifts the normal range toward the high-pressure side in accordance with changes in the vehicle outside temperature, so as to prevent an erroneous determination from being made due to an increase in the vehicle outside temperature despite the normally operating high-pressure side fuel pressure sensor 132.

(5) When the index value of the vehicle outside temperature, that is obtained when the controller 400 is activated by the soak timer 101, is higher than the index value of the vehicle outside temperature stored in the nonvolatile memory 102, the determining section 301 of the controller 400 shifts the normal range toward the high-pressure side to a greater extent as the difference between the index values increases. The controller 400 is capable of changing the correction amount in accordance with the deviation between the index value of the vehicle outside temperature that is stored in the nonvolatile memory 102, and the index value of the vehicle outside temperature obtained by activating the determining section 301 while the main switch 120 is off.

That is, this configuration allows the normal range to be more finely corrected than a case in which whether the correction should be performed is determined on the basis of whether the index value of the outside temperature, that has been obtained by activating the determining section 301 while the main switch 120 is off, is deviated from the index value of the vehicle outside temperature, that is stored in the nonvolatile memory 102, by a certain amount, and in which the correction is performed in a uniform manner when there is a deviation.

(6) The controller 400 has the first specified amount of time, the second specified amount of time, and the third specified amount of time, which have different lengths. When the elapsed amount of time reaches each of the specified amounts of time, the soak timer 101 activates the controller 400, so that the determining section 301 determines whether the performance condition for the rationality check is met. If the performance condition is met, the determining section 301 performs the rationality check. If the performance condition is not met, the determining section 301 slops operating again without performing the rationality check. Until the rationality check is completed, determination as to whether the performance condition is met is repeated each time the elapsed amount of time reaches each of the specified amounts of time.

Thus, the controller 400 ensures opportunities for performance of the rationality check as compared to a case in which only one specified amount of time is set, and the rationality check is not performed if the performance condition is not met when the specified amount of time is reached. That is, the rationality check is performed when the condition suitable for the rationality check is met, so as to ensure the accuracy of the rationality check. Also, opportunities for performance of the rationality check is ensured.

(7) The rationality check is performed only once during the amount of time during which the main switch 120 is off. This allow s the result of the rationality check to be quickly concluded as compared to a case in which the rationality check is performed each time the elapsed amount of time reaches each of multiple specified amounts of time even after the rationality check is completed.

The present embodiment may be modified as follows. The present embodiment and the following modifications can be combined as long as the combined modifications remain technically consistent with each other.

As long as the performance condition can be made strict when the stored value is higher than the obtained value, the specific method may be changed. The above-described embodiment provides an example in which the calculation map for calculating the specified temperature a and the calculation map for calculating the threshold b are both switched in accordance with the magnitude of the difference obtained by subtracting the stored value from the obtained value. However, only one of the calculation maps may be switched. Even in this case, the performance condition can be made strict when the stored value is higher than the obtained value.

The method for changing the performance condition is not limited to the method that switches the calculation maps for calculating the specified temperature a and the threshold b. For example, the performance condition may be made strict or relaxed by correcting the value calculated using the basic map. A correction may be performed in which the specified temperature a that is calculated using the basic map becomes lower or the threshold b that is calculated using the basic map becomes higher as the difference obtained by subtracting the stored value from the obtained value increases. The magnitude of the difference obtained by subtracting the stored value from the obtained value may be used as an input, and the specified temperature a and the threshold b may be directly calculated taking into the magnitude of the difference into consideration. That is, the calculation map described with reference to FIG. 5 may be a two-dimensional map, and the calculation map described with reference to FIG. 6 may be a three-dimensional map. This configuration eliminates the necessity for preparing two or more calculation maps, allowing the process of selecting the calculation map to be omitted.

The performance condition is not limited to the one in the above-described embodiment. For example, the performance condition may be only one of the coolant temperature being less than the specified temperature a or the warm-up index value being greater than or equal to the threshold b. For example, the performance condition may be the coolant temperature being less than the specified temperature a.

The specific method for shifting the normal range toward the high-pressure side is not limited to the correction process. For example, calculation maps may be employed that use, as an input, the magnitude of the difference obtained by subtracting the stored value from the obtained value, and simply output the normal range, so that the normal range is directly determined on the basis of the magnitude of the difference.

Figure 8:
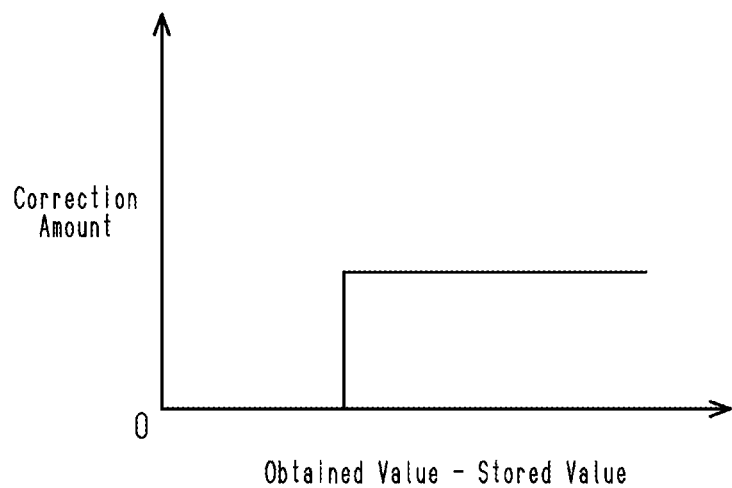
FIG. 8 is a graph showing the relationship between a correction amount in a correction process and a difference obtained by subtracting a stored value of the vehicle outside temperature from an obtained value of the vehicle outside temperature in a modification.

Whether to correct the normal range may be determined by determining whether the deviation between the obtained value and the stored value is greater than or equal to a predetermined amount. If the deviation is greater than or equal to the predetermined amount, the normal range may be corrected toward the high-pressure side by a uniform correction amount. When this configuration is employed, the correction amount is 0 when the difference between the obtained value and the stored value is less than the predetermined amount as shown in FIG. 8, so that the normal range is not corrected. In contrast, when the difference between the obtained value and the stored value is greater than or equal to the predetermined amount, the normal range is corrected by a uniform correction amount. Even with this configuration, erroneous determinations are limited as compared to a case in which the normal range is not shifted. Further, whether to correct the normal range is determined by determining whether the deviation between the obtained value and the stored value is greater than or equal to a predetermined amount. If the deviation is greater than or equal to the predetermined amount, the shift amount, by which the normal range is shifted toward the high-pressure side, is increased as the amount by which the obtained value is greater than the stored value increases.

It is possible to omit the correction process that shifts the normal range toward the high-pressure side as long as the following configuration is employed. The configuration is that the performance condition is made strict in a case in which the index value of the vehicle outside temperature, that is obtained when the specified amount of time is reached and the determining section 301 is activated, is higher than the index value of the vehicle outside temperature, that is stored before the main switch 120 is turned off so that power supply is stopped, as compared to a case in which the obtained index value of the vehicle outside temperature is not higher than the stored index value of the vehicle outside temperature. That is, if a configuration that makes the performance condition strict is employed, an erroneous determination is prevented from being made due to an increase in the vehicle outside temperature as compared to a configuration that does not change the performance condition.

In the above-described embodiment, an example is described in which the internal combustion engine 40 includes the high-pressure fuel supply system 70 and the low-pressure fuel supply system 50. However, the internal combustion engine 40 does not necessarily have to include two fuel supply systems. For example, the internal combustion engine in which the controller 400 is employed may include only a fuel supply system that corresponds to the high-pressure fuel supply system 70 without being equipped with the low-pressure side delivery pipe 55 or the port injection valves 43. In a fuel supply system that corresponds to the low-pressure fuel supply system 50 but is not equipped with the high-pressure fuel pump 60, the rationality check can be performed by increasing live fuel pressure to the pressure at which the pressure regulator 56 is opened. That is, the rationality check can be performed on the basis of whether the detected fuel pressure is within the normal range, the center of which is a value closer to the upper limit.

However, in the case of the high-pressure fuel supply system 70, which stores fuel having a pressure as high as several MPa, the fuel pressure needs to be increased by driving the high-pressure fuel pump 60 until the relief valve 66 is opened in order to perform the rationality check of the high-pressure side fuel pressure sensor 132, which detects the fuel pressure in the high-pressure side delivery pipe 71. When driven, the high-pressure fuel pump 60 generates operating noise. Such a problem depends not on whether the fuel injection valves are the direct injection valves 44 or the port injection valves 43, but on whether the fuel pressure accumulated in the delivery pipe is high. Thus, when high pressure exceeding several MPa is accumulated in the delivery pipe, the fuel injection valves may be the port injection valves 43. Even in this case, the high-pressure fuel pump 60 must be operated in order to perform the rationality check with reference to the pressure closer to the upper limit, which generates operating noise. Thus, the controller 400 preferably includes the determining section 301, which executes the correction process, as in the above-described embodiment.

The method for calculating the w arm-up index value can be changed as appropriate. For example, the warm-up index value may increase as the accumulated operation time increases during the operation of the controller 400.

The above-described embodiment describes an example in which, once the rationality check is completed, the rationality check is not performed while the main switch 120 is off. The present disclosure is not limited to this. That is, the rationality check may be performed each time each of the specified amounts of time is reached. For example, the latest result of the rationality check may be used.

Although the result of the rationality check is concluded by the rationality check that is first performed, the rationality check may be pet formed thereafter each time the elapsed amount of time reaches each of specified amounts of time. This configuration consumes power since the controller 400 is activated to determine whether the performance condition is made, and to perform the rationality check. As compared with this configuration, the above-described embodiment reduces power consumption because it per forms the rationality check only once while the period in which the main switch 120 is off is continuing.

That is, a configuration may be employed in which only one specified amount of time is set, and the rationality check is not performed if the performance condition is not met when the specified amount of time is reached.

The controller 400 is not limited to a controller that includes the system control unit 100, the power control unit 200, and the engine control unit 300. For example, the controller may be physically one unit. Alternatively, the controller may include four or more units.

Further, the controller may be circuitry including (A) one or more processors that perform various processes according to computer programs (software); (B) one or more dedicated hardware circuits such as application specific integrated circuits (ASIC) that execute at least part of the various processes, or (C) a combination thereof. The processor includes a CPU and memories such as a RAM and a ROM. The memories store program codes or commands configured to cause the CPU to execute processes. The memory, or computer readable medium, includes any type of media that are accessible by general-purpose computers and dedicated computers.

The method for calculating the estimated outside air temperature may be changed as appropriate. For example, the determining section 301 may calculate, as the estimated outside air temperature, the minimum value of the temperature of the intake air during the current trip. Also, the determining section 301 may calculate, as the estimated outside air temperature, the coolant temperature at the first starting of the internal combustion engine 40 during the current trip. Alternatively, the determining section 301 may calculate, as the estimated outside air temperature, the average value of the minimum value of the temperature of the intake air during the current trip and the coolant temperature at the first starting of the internal combustion engine 40 during the current trip.

The above-described embodiment provides an example in which the coolant temperature is stored in the process of step S230 as the obtained value, which is an index value of the vehicle outside temperature. However, the obtained value simply needs to be an index value of the vehicle outside temperature. Therefore, in a case in which the present disclosure is employed in a vehicle having an outside temperature sensor that detects the vehicle outside temperature, the vehicle outside temperature may be obtained in the process of step S200 using the outside temperature sensor, and the obtained outside temperature may be stored as the obtained value in the process of step S230.

The controller that changes the performance condition for the rationality check may be employed in a plug-in hybrid vehicle, in which the battery 30 can be charged by an externa) power source. Also, the controller that changes the performance condition for the rationality check may be employed in a vehicle that travels only by the force of the internal combustion engine 40.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller for a vehicle equipped with an internal combustion engine, wherein
the vehicle includes
a high-pressure fuel pump,
a delivery pipe that stores high pressure fuel pressurized by the high-pressure fuel pump, a fuel injection valve that injects fuel stored in the delivery pipe, and
a fuel pressure sensor that detects a pressure of the fuel in the delivery pipe, the controller comprises:
a soak timer that measures an amount of time elapsed since a main switch of the vehicle was turned off;
a nonvolatile memory that retains information even when the main switch is turned off so that a power supply is stopped; and
a determining section that is configured to be activated when the elapsed amount of time reaches a specified amount of time while the main switch is off, obtain a fuel pressure using the fuel pressure sensor, and perform a rationality check for determining whether the obtained fuel pressure is within a normal range, wherein the determining section is configured to
perform the rationality check on a condition that a performance condition is met, and
make the performance condition strict in a case in which an obtained index value of a vehicle outside temperature, that is obtained when the elapsed amount of time reaches the specified amount of time and the determining section is activated, is higher than a stored index value of the vehicle outside temperature, that is stored in the nonvolatile memory before the main switch is turned off so that the power supply is slopped, as compared to a case in which the obtained index value of the vehicle outside temperature is not higher than the stored index value of the vehicle outside temperature.

2. The vehicle controller according to claim 1, wherein
the performance condition includes a condition where a coolant temperature of the internal combustion engine, that is obtained when the elapsed amount of time reaches the specified amount of time and the determining section is activated, is lower than a specified temperature, and
the determining section is configured to lower the specified temperature in a case in which the obtained index value of the vehicle outside temperature, that is obtained when the elapsed amount of time reaches the specified amount of time and the determining section is activated, is higher than the stored index value of the vehicle outside temperature, that is stored in the non-volatile memory before the main switch is turned off so that the power supply is stopped, as compared to a ease in which the obtained index value of the vehicle outside temperature is not higher than the stored index value of the vehicle outside temperature.

3. The vehicle controller according to claim 1, wherein
the performance condition includes a condition that a warm-up index value is greater than or equal to a threshold, the warm-up index value being a value that is increased as an extent of warm-up of the internal combustion engine increases, wherein the extent of the warm-up of the internal combustion engine is stored in the nonvolatile memory when the main switch is turned off so as to stop operation of the controller,
the determining section is configured to increase the threshold in a case in which the obtained index value of the vehicle outside temperature, that is obtained when the elapsed amount of time reaches the specified amount of time and the determining section is activated, is higher than the stored index value of the vehicle outside temperature, that is stored in the non-volatile memory before the main switch is turned off so that the power supply is stopped, as compared to a case in which the obtained index value of the vehicle outside temperature is not higher than the stored index value of the vehicle outside temperature.

4. The vehicle controller according to claim 1, wherein the determining section is configured to shift the normal range used in the rationality check toward a high-pressure side in a case in which the obtained index value of the vehicle outside temperature, that is obtained when the elapsed amount of time reaches the specified amount of time and the determining section is activated, is higher than the stored index value of the vehicle outside temperature, that is stored in the nonvolatile memory before the main switch is turned off so that the power supply is stopped, as compared to a case in which the obtained index value of the vehicle outside temperature is not higher than the stored index value of the vehicle outside temperature.

5. The vehicle controller according to claim 1, wherein
the specified amount of time is one of specified amounts of time having different lengths, and
the determining section is configured to
be activated by the soak timer each time the elapsed amount of time reaches each of the specified amounts of time, so as to determine whether the performance condition is met,
perform the rationality check if the performance condition is met, and
stop the operation of the controller again without performing the rationality check, when the performance condition is not met.

6. The vehicle controller according to claim 5, wherein the controller is configured to not activate the determining section, while a state in which the main switch is off is continuing, after the rationality check is completed once, while a state in which the main switch is off is continuing, so that the rationality check is not performed.

7. A vehicle controller for a vehicle equipped with an internal combustion engine, wherein
the vehicle includes
a high-pressure fuel pump,
a delivery pipe that stores high pressure fuel pressurized by the high-pressure fuel pump,
a fuel injection valve that injects fuel stored in the delivery pipe, and
a fuel pressure sensor that detects a pressure of the fuel in the delivery pipe, the controller comprises circuitry including:
a soak timer that measures an amount of time elapsed since a main switch of the vehicle was turned off;
a nonvolatile memory that retains information even when the main switch is turned off so that a power supply is stopped; and
a determining section that is configured to be activated when the elapsed amount of time reaches a specified amount of time while the mam switch is off, obtain a fuel pressure using the fuel pressure sensor, and perform a rationality check for determining whether the obtained fuel pressure is within a normal range, wherein the determining section is configured to
perform the rationality check on a condition that a performance condition is met, and
make the performance condition strict in a case in which an obtained index value of a vehicle outside temperature, that is obtained when the elapsed amount of time reaches the specified amount of time and the determining section is activated, is higher than a stored index value of the vehicle outside temperature, that is stored in the nonvolatile memory before the main switch is turned off so that the power supply is slopped, as compared to a case in which the obtained index value of the vehicle outside temperature is not higher than the stored index value of the vehicle outside temperature.

8. A vehicle control method for a vehicle equipped with an internal combustion engine, wherein
the vehicle includes
a high-pressure fuel pump,
a delivery pipe that stores high pressure fuel pressurized by the high-pressure fuel pump,
a fuel injection valve that injects fuel stored in the delivery pipe, and
a fuel pressure sensor that detects a pressure of the fuel in the delivery pipe, and
the control method comprises:
measuring an amount of time elapsed since a main switch of the vehicle was turned off;
retaining information even when the mam switch is turned off so that a power supply is stopped;
when the elapsed amount of time reaches a specified amount of time while the mam switch is off, obtaining a fuel pressure using the fuel pressure sensor, and performing a rationality check for determining whether the obtained fuel pressure is within a normal range on a condition that a performance condition is met; and
making the performance condition strict in a case in which an obtained index value of a vehicle outside temperature, that is obtained when the elapsed amount of time reaches the specified amount of time and the determining section is activated, is higher than a stored index value of the vehicle outside temperature, that is stored in the nonvolatile memory before the main switch is turned off so that the power supply is stopped, as compared to a case in which the obtained index value of the vehicle outside temperature is not higher than the stored index value of the vehicle outside temperature.

* * * * *